United States Patent Office 2,693,430
Patented Nov. 2, 1954

2,693,430

PROCESS FOR RENDERING TEXTILE MATERIALS WATER-REPELLENT

James M. Cross, Belvidere, and Raymond L. Mayhew, Phillipsburg, N. J., assignors to General Aniline & Film Corporation, New York, N. Y., a corporation of Delaware No Drawing. Original application December 16, 1948, Serial No. 65,725. Divided and this application January 17, 1952, Serial No. 267,011

7 Claims. (Cl. 117—121)

This invention relates to a process for rendering textile materials water-repellent by treatment with quaternary nitrogen compounds.

This application is a division of our copending application Serial No. 65,725, filed December 16, 1948, now abandoned.

The compounds employed in accordance with this invention are obtained by condensing a halomethyl ether of a nuclear alkyl substituted monoaryl glycol ether, of the type described in our copending application Serial No. 65,720, filed December 16, 1948 (now U. S. Patent 2,554,441), with a tertiary nitrogen base. The resulting compounds have the following general formula:

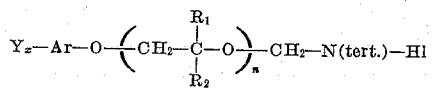

wherein Ar represents an aryl radical containing no water-solubilizing groups such as carboxyl, sulfo or quaternary nitrogen groups, and no reactive substituents such as nuclear halomethyl groups, Y represents a nuclear alkyl group of at least 8 carbon atoms, $x$ is an integer from 1 to 3, $R_1$ and $R_2$ represent hydrogen or a lower alkyl group, especially a methyl group, and $n$ is an integer, at least 1; N(tert.) represents a radical of a tertiary nitrogen base, and HI represents a halogen atom, particularly chlorine or bromine. Compounds of the foregoing general formula are water-soluble cationic surface-active materials, yielding colloidal solutions in water and having outstanding properties as dispersing, wetting and emulsifying agents.

In accordance with this invention, the aforesaid compounds, which contain a higher alkyl group of at least 8 (e. g. 8 to 18) carbon atoms, are used for impregnating textile fabrics to render the same water-repellent. Thus, after impregnating the material with a solution of one of the aforesaid compounds and drying and heating at elevated temperatures (e. g. 120° to 160° C.), the quaternary nitrogen radical is split off or decomposed, and a water-repellent residue is deposited on the fabric which adheres tenaciously thereto, withstanding repeated washing and dry cleaning operations. Some of the compounds having the formula above set out also possess germicidal and fungicidal properties. The compounds of this invention are prepared by reacting the halomethyl ether of a nuclear alkyl substituted monoaryl glycol ether of the type disclosed in our copending application Serial No. 65,720, filed December 16, 1948 (now U. S. Patent 2,554,441), having the following general formula:

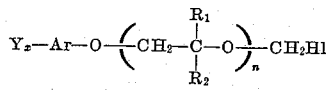

wherein Ar is an aryl nucleus, Y is a nuclear group of at least 8 and preferably 8 to 18 carbon atoms, $x$ is an integer from 1 to 3, said aryl radical containing no reactive and no water-solubilizing substituents, and

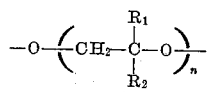

is a glycol radical, wherein $R_1$ and $R_2$ are members of the group consisting of hydrogen and lower alkyl groups, and $n$ is an integer, at least 1; and Hl is a member of the group consisting of chlorine and bromine; with a tertiary nitrogen base at a temperature ranging from room temperature (20° to 30° C.) to about 85° C., with or without an inert solvent. It is often convenient, particularly when the tertiary nitrogen base is a liquid such as pyridine, to utilize an excess of the base as the solvent reaction medium. The proportion of tertiary nitrogen base employed is preferably in excess of 1 mol per mol of the halomethyl ether, e. g. 2 or more mols of the nitrogen base are preferably used per mol of the ether to insure completion of the reaction. When the reaction is complete, excess tertiary nitrogen base and solvent, if present, can be removed by distillation from the reaction mixture. If desired, other acid radicals can be substituted for the halogen originally present as the anion of the resulting quaternary salt, e. g. by metathesis with other salts or acids.

The aryl radical represented by Ar in the general formula given above may contain additional nuclear substituents which are non-reactive and non-water-solubilizing, as for example, halogen (e. g. chlorine or bromine), lower alkyl groups (e. g. methyl or ethyl groups). Preferably, however, the aryl radical is unsubstituted except for the nuclear alkyl group of at least 8 carbon atoms and the glycol ether radical. The aryl nucleus may be polycyclic, e. g. it may be a naphthyl, biphenyl or similar aromatic nucleus, but preferably, it is a phenyl nucleus.

The alkyl radicals of at least 8 carbon atoms represented by Y in the general formula given above generally occupy ortho- and para-positions relative to the glycol radical. Valuable compounds of this type are those in which a single alkyl group is present which may be obtained by condensing an olefine with a phenol in the presence of sulfuric acid or other suitable catalyst.

The glycol radical represented in the general formula by

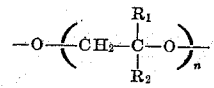

preferably contains 1 to 3 oxyalkylene groups, especially oxyethylene groups or lower homologues thereof in which $R_1$ and $R_2$ may be hydrogen or a methyl group.

The following examples illustrate the preparation of a number of preferred compounds in accordance with our invention, parts being by weight:

*Example 1*

142 parts of dodecylphenoxyethoxy chloromethane are added, with agitation, to 200 parts of pyridine. The temperature rises spontaneously to 55° C., and is thereupon raised by heating to 75° C., the latter temperature being maintained for 30 minutes. Excess pyridine is distilled off at an absolute pressure of 50 mm. of Hg, at 50° to 60° C. A thick, waxy product remains as a residue which dissolves readily in water. The product has the following formula:

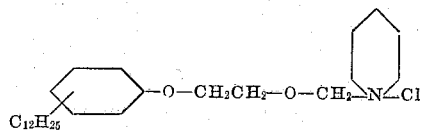

A 2 to 5% aqueous solution of the product of this example is applied to a cellulosic fabric, which is then dried and cured at 120° to 160° C. for 10 to 3 minutes. A strongly water-repellent finish is thereby produced which is permanent to dry cleaning and laundry operations.

*Example 2*

80 parts of octadecylphenoxyethoxy chloromethane are added, with agitation, to 100 parts of pyridine. The temperature rises spontaneously to 55° C. and is thereupon raised by heating to 75° C., the latter temperature being maintained for 30 minutes. A sample of the reaction mixture is thereupon found to be completely dispersible in water. Excess pyridine is then distilled under reduced pressure, as described in Example 1. A residue is obtained of a product having the following formula:

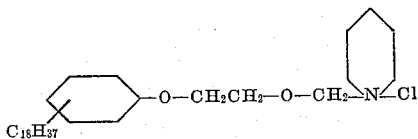

Cotton broadcloth is impregnated with a 5% aqueous solution of the product of this example, dried, and then cured for 3 minutes at 160° C. A water-repellent finish is produced on the fabric superior in its water-repellent properties to that of Example 1.

Example 3

100 parts of octadecylphenoxy-2-propoxy chloromethane are added to 200 parts of pyridine while vigorously agitating the mixture. The temperature rises spontaneously to 50° C., whereupon the product is found to be water-soluble. The temperature is raised to 70° C. and maintained at this temperature for 30 minutes to insure completion of the reaction. Excess pyridine is removed by distillation under a reduced pressure of 50 mm. of Hg. A semi-solid product remains as the residue having an odor of pyridine. The product thus obtained has the following formula:

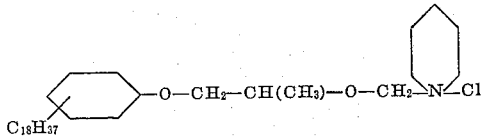

This product is applied to cotton broadcloth in the form of a 5% aqueous solution, and after drying the cloth and curing at 120° to 160° C. for 10 to 3 minutes, the broadcloth is found to have excellent water-repellency.

Example 4

100 parts of benzyl dimethylamine are added, with agitation, to 88.5 parts of p-(2,4,4-trimethylamyl-2)-phenoxyethoxy chloromethane. The temperature rises spontaneously to 80° C. and is reduced to 70° C. by cooling. Agitation is continued at 70° C. for 30 minutes. About 325 parts of petroleum ether (having a boiling range of 30° to 60° C.) are added, whereby a slurry of the resulting quaternary salt is formed. The precipitated product is filtered out and dried in a vacuum desiccator. On analysis, it is found that the product contains 3.51% of nitrogen and 8.25% of chlorine, as compared with theoretical values of 3.23% and 8.20%, respectively. The product, which has the following formula, is water-soluble and possesses valuable germicidal properties:

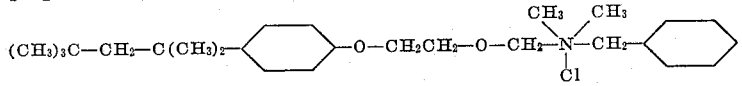

Tertiary nitrogen bases which are suitable for the preparation of the quaternary compounds of this invention include tertiary heterocyclic nitrogen bases such as pyridine. picolines, lutidines, pyrrole and its C-methyl derivatives; quinoline, N-methyl morpholine, N-methyl piperidine, N-benzyl piperidine; tertiary alkyl, aryl, aralkyl, and cycloalkyl amines such as trimethylamine, triethylamine, tributylamine, triamylamine, triethanolamine, methyl diethanolamine, dimethyl triethanolamine, dimethyl cyclohexylamine, dimethylaniline, diethylaniline, and benzyl diethylamine.

The halomethyl ethers of nuclear alkyl monoaryl glycol ethers which are suitable for the preparation of the compounds in the present invention are those compounds prepared in accordance with our copending application Serial No. 65,720, filed December 16, 1948 (now U. S. Patent 2,554,441), having the general formula given above.

The phenyl glycol ethers containing a nuclear alkyl group of at least 8 carbon atoms, e. g. 8 to 18 carbon atoms, yield products having outstanding utility as water-repellents for the impregnation of textile fabrics. While the glycol radical of these compounds may contain more than one oxyalkylene group, e. g. 1 to 3 oxyalkylene groups, those containing a single oxyalkylene residue or a methyl homologue thereof, are preferred. Chloromethyl derivatives are preferred to bromomethyl derivatives because of the lower cost. When bromomethyl ethers are employed as intermediates, the resulting compounds are the quaternary bromides rather than the chlorides.

In carrying out the reaction, the halomethyl ether is preferably treated with a substantial excess of the tertiary nitrogen base to insure rapid completion of the quaternary salt formation. A convenient method of carrying out the reaction involves utilizing the tertiary base as the reaction medium. As indicated in the examples, the mol ratio of the tertiary base to the halomethyl ether is advantageously not less than 2:1 and may range as high as about 12:1. Inert volatile solvents such as benzene, toluene, carbon tetrachloride and low boiling petroleum fractions can be included in the reaction mixture, but are generally not required. The reaction temperature ranges from 50° to 85° C., and is preferably between 70° to 80° C. The reaction is allowed to proceed until the reaction mixture is water-soluble, this stage being reached ordinarily in ½ to 1 hour. Upon completion of the reaction, excess tertiary nitrogen base can be removed by distillation, preferably under reduced pressure, and the residue, consisting of the quaternary nitrogen halide, can be purified by slurrying with organic liquids such as acetone, ether, or petroleum naphtha, in which the quaternary salt is insoluble.

The resulting quaternary compounds, as indicated in the examples, are cationic surface-active agents, soluble in water to form colloidal solutions having wetting, emulsifying and dispersing properties. The solutions are employed for impregnating textiles, followed by drying and curing at elevated temperatures of, for example, 120° to 160° C., to yield a water-repellent residue on the fiber which resists repeated washing and dry cleaning operations.

Variations and modifications which will be obvious to those skilled in the art can be made in the foregoing procedures and materials without departing from the scope or spirit of the invention.

We claim:

1. A process for rendering textile materials water-repellent, which comprises impregnating the material with a solution of a water-soluble quaternary nitrogen base salt having the following general formula:

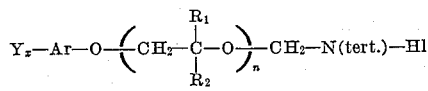

wheerin Ar represents an aryl nucleus, Y is a nuclear alkyl group of at least 8 carbon atoms, $x$ is an integer from 1 to 3, said aryl radical containing no reactive and no water-solubilizing substituents, $R_1$ and $R_2$ are members of the group consisting of hydrogen and lower alkyl groups, and $n$ is an integer, at least 1; N(tert.) represents the radical of a tertiary nitrogen base, and Hl represents a member of the group consisting of chlorine and bromine, drying the impregnated material and heating at a temperature of 120° to 160° C., to cure the quaternary compound.

2. A process for rendering textile materials water-repellent, which comprises impregnating the material with a solution of a water-soluble quaternary nitrogen base salt having as one of the nitrogen substituents, an oxymethyl group etherified with a nuclear alkyl monophenyl glycol ether, wherein the nuclear alkyl group contains at least 8 carbon atoms, the phenyl radical being otherwise unsubstituted, and wherein the glycol radical consists of a chain of 1 to 3 oxyalkylene groups, drying the impregnated material and heating at a temperature of 120° to 160° C., to cure the quaternary compound.

3. A process for rendering textile materials water-repellent, which comprises impregnating the material with a solution of a water-soluble quaternary nitrogen base salt having as one of the nitrogen substituents, an oxymethyl group etherified with a mononuclear alkyl monophenyl glycol ether, wherein the alkyl group is the radical of an alcohol corresponding to a fatty acid occurring in natural fats, the phenyl radical being otherwise unsubstituted, and wherein the glycol radical consists of a single oxyalkylene group of 2 to 3 carbon atoms, drying the impregnated material and heating at a temperature of 120° to 160° C., to cure the quaternary compound.

4. A process for rendering textile materials water-repellent, which comprises impregnating the material with an aqueous solution of a quaternary nitrogen base salt having the following formula:

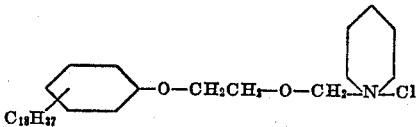

drying the impregnated material and heating at a temperature of 120° to 160° C. to cure the quaternary compound.

5. A process for rendering textile materials water-repellent, which comprises impregnating the material with an aqueous solution of a quaternary nitrogen base salt having the following formula:

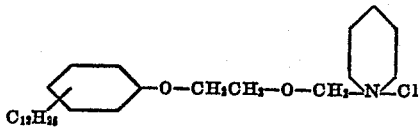

drying the impregnated material and heating at a temperature of 120° to 160° C. to cure the quaternary compound.

6. A process for rendering textile materials water-repellent, which comprises impregnating the material with an aqueous solution of a quaternary nitrogen base salt having the following formula:

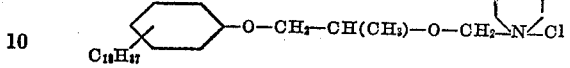

drying the impregnated material and heating at a temperature of 120° to 160° C. to cure the quaternary compound.

7. A process for rendering textile materials water-repellent, which comprises impregnating the material with an aqueous solution of a quaternary nitrogen base salt having the following formula:

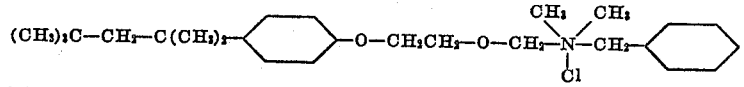

drying the impregnated material and heating at a temperature of 120° to 160° C. to cure the quaternary compound.

References Cited in the file of this patent

UNITED STATES PATENTS

| Number | Name | Date |
|---|---|---|
| 2,115,250 | Bruson | Apr. 26, 1938 |

FOREIGN PATENTS

| Number | Country | Date |
|---|---|---|
| 477,991 | Great Britain | Jan. 10, 1938 |
| 484,906 | Great Britain | May 9, 1938 |